United States Patent
Poehlmann et al.

(10) Patent No.: US 12,472,262 B2
(45) Date of Patent: Nov. 18, 2025

(54) PEPTIDE FOR USE IN THE REDUCTION OF SIDE EFFECTS IN THE FORM OF IMMUNOSTIMULATORY REACTIONS/EFFECTS

(71) Applicant: Friedrich-Schiller-Universitaet Jena, Jena (DE)

(72) Inventors: Tobias Poehlmann, Zwickau (DE); Rolf Guenther, Hamburg (DE); Michael Reuter, Jena (DE); Mirko Ludwig, Jena (DE)

(73) Assignee: FRIEDRICH-SCHILLER-UNIVERSITAET JENA, Jena (DE)

( * ) Notice: Subject to any disclaimer, the term of this patent is extended or adjusted under 35 U.S.C. 154(b) by 0 days.

(21) Appl. No.: 17/650,216

(22) Filed: Feb. 7, 2022

(65) Prior Publication Data

US 2022/0241426 A1     Aug. 4, 2022

Related U.S. Application Data

(63) Continuation of application No. 15/503,810, filed as application No. PCT/EP2015/068634 on Aug. 13, 2015, now abandoned.

(30) Foreign Application Priority Data

Aug. 14, 2014    (EP) ................................. 14181072.1

(51) Int. Cl.
    *A61K 47/64*       (2017.01)
    *A61K 48/00*       (2006.01)

(52) U.S. Cl.
    CPC .......... *A61K 47/64* (2017.08); *A61K 48/0033* (2013.01)

(58) Field of Classification Search
    CPC ........................... A61K 47/64; A61K 48/0033
    See application file for complete search history.

(56) References Cited

U.S. PATENT DOCUMENTS

| | | |
|---|---|---|
| 5,898,031 A | 4/1999 | Crooke |
| 7,056,704 B2 | 6/2006 | Tuschl |

(Continued)

FOREIGN PATENT DOCUMENTS

| | | | |
|---|---|---|---|
| WO | 2008098569 A2 | 8/2008 | |
| WO | 2010102615 A1 | 9/2010 | |
| WO | WO-2014086835 A1 * | 6/2014 | ............ A61K 47/56 |

OTHER PUBLICATIONS

Takeda et al., Site-specific conjugation of oligonucleotides to the C-terminus of recombinant protein by expressed protein ligation, Bioorg Med Chem Lett. May 17, 2004;14(10):2407-10. doi: 10.1016/j.bmcl.2004.03.023. PMID: 15109622 (Year: 2004).*

(Continued)

*Primary Examiner* — Randall L Beane
(74) *Attorney, Agent, or Firm* — Abel, Schillinger, LLP

(57) ABSTRACT

What is described is a peptide for use in the reduction of side-effects in form of immunostimulatory reactions/effects which occur with gene therapy, wherein the peptide is coupled to a nucleic acid molecule used in gene therapy. Furthermore, such a peptide is described for use in the reduction of side-effects in form of immunostimulatory reactions/effects which occur with gene therapy, wherein the peptide is coupled to a nucleic acid molecule used in gene therapy, wherein the immunostimulatory reactions/effects are induced by activation of IFIT1/2, IRF9, TLR3, TLR7, TLR8 or PKR.

9 Claims, 2 Drawing Sheets

Figure 1:
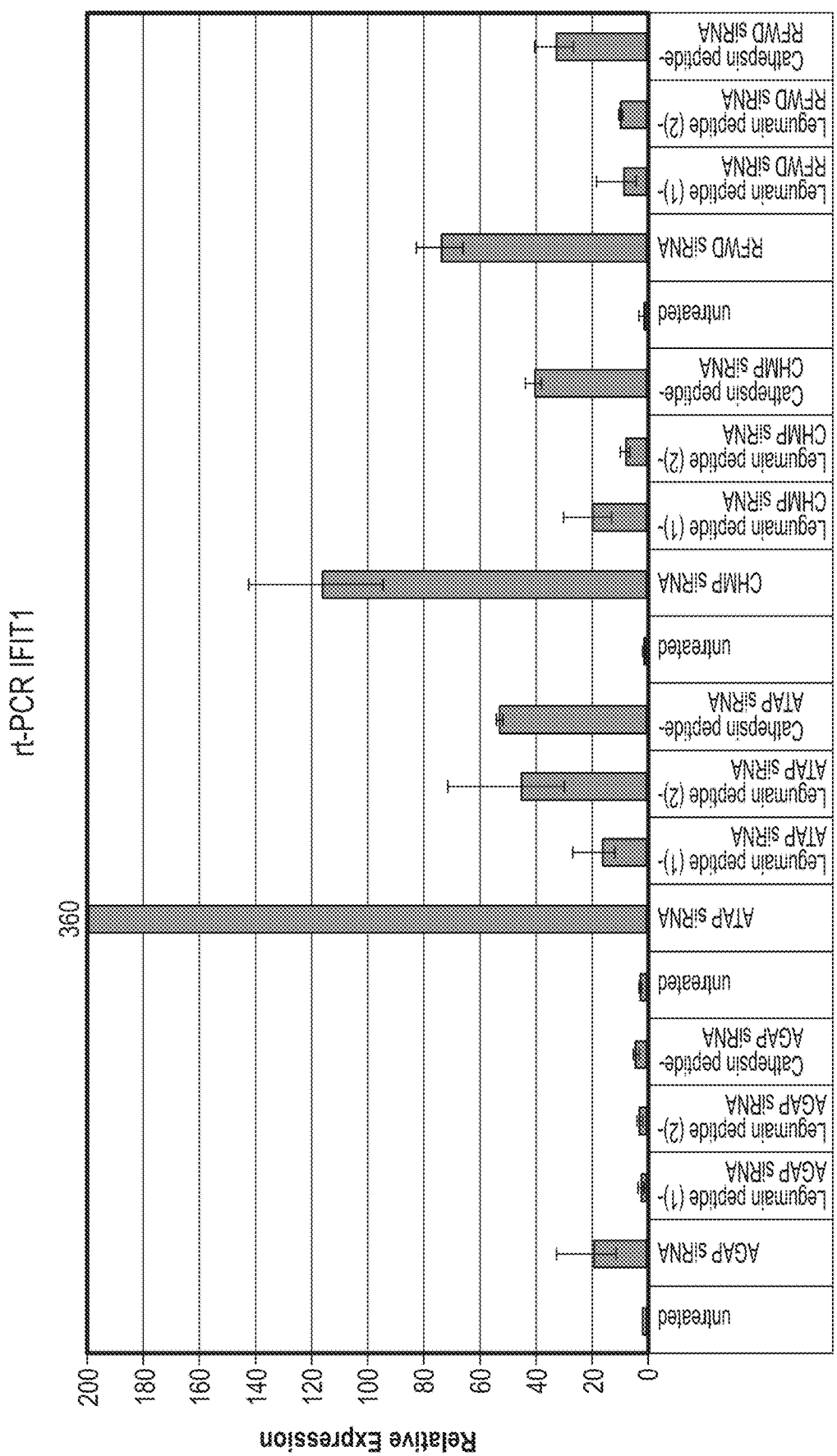
Figure 1:
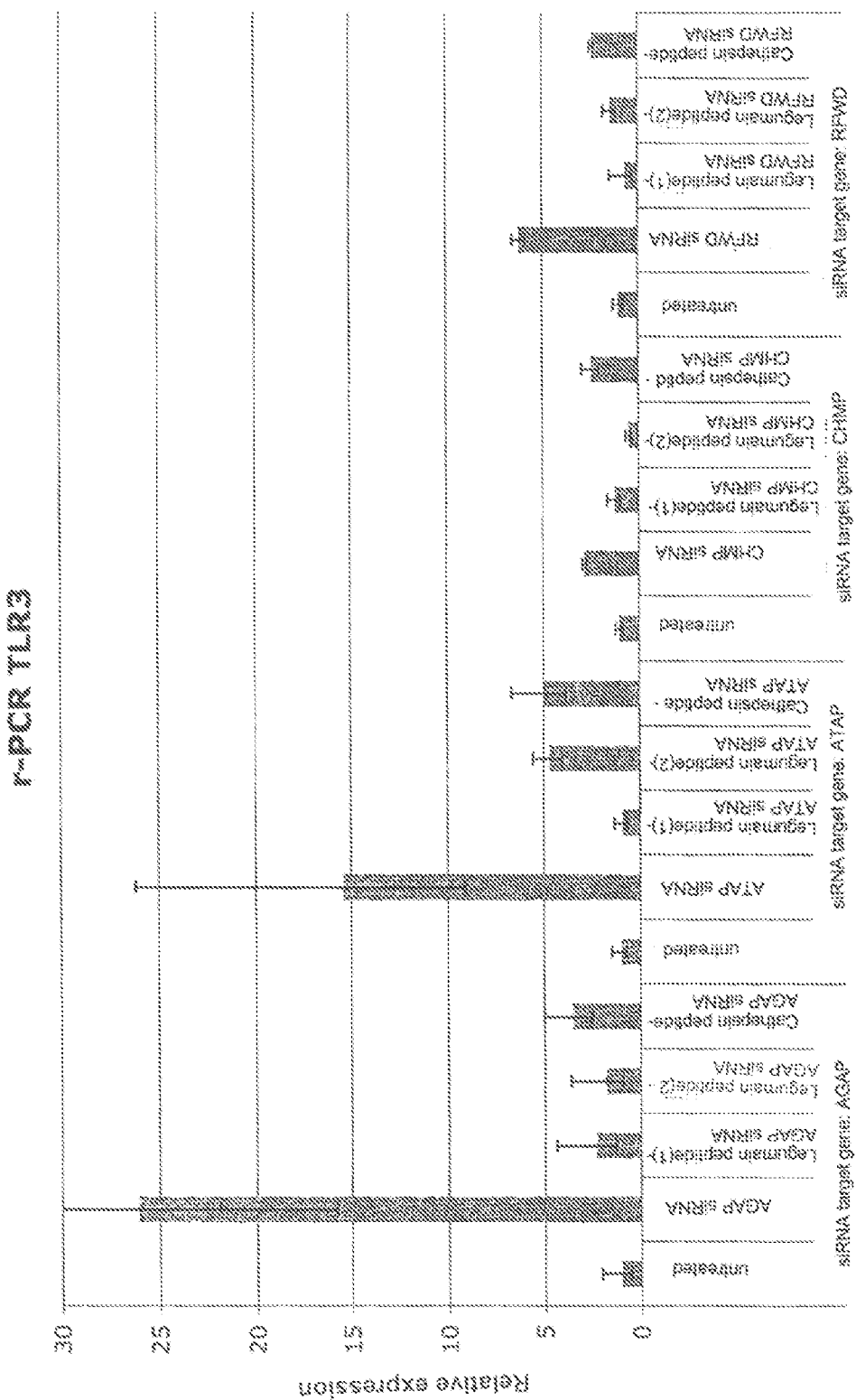

Specification includes a Sequence Listing.

(56) References Cited

U.S. PATENT DOCUMENTS

| | | | |
|---|---|---|---|
| 9,315,808 B2* | 4/2016 | Poehlmann | C12N 15/111 |
| 9,347,060 B2* | 5/2016 | Poehlmann | C12N 15/113 |
| 2010/0009446 A1* | 1/2010 | Poehlmann | C12N 15/111 |
| | | | 435/375 |
| 2011/0319342 A1* | 12/2011 | Poehlmann | C12N 15/111 |
| | | | 977/773 |
| 2013/0065939 A1* | 3/2013 | Judge | A61P 35/00 |
| | | | 435/375 |
| 2013/0130986 A1 | 5/2013 | Gruber | |

OTHER PUBLICATIONS

"ECFP", fpbase.org, attached as 2-page pdf, published Sep. 29, 2018, also available at www.fpbase.org/protein/ecfp/ (last visited Aug. 8, 2023) (Year: 2018).*

Biosyn, Cell Penetrating or "Trojan" Peptides—CPPs, biosyn.com, 5 pages (Jun. 20, 2009), attached as pdf, available at www.biosyn.com/tew/cell-penetrating-or-trojan-peptides-cpps.aspx (last visited Aug. 8, 2023) (Year: 2009).*

De Figueiredo et al. (Cell-penetrating peptides: A tool for effective delivery in gene-targeted therapies. IUBMB Life. Mar. 2014;66(3):182-194. doi: 10.1002/iub.1257. Epub Mar. 23, 2014. PMID: 24659560 (Year: 2014).*

Muratovska et al., Conjugate for efficient delivery of short interfering RNA (siRNA) into mammalian cells. FEBS Lett. Jan. 30, 2004;558(1-3):63-8. doi: 10.1016/S0014-5793(03)01505-9. Erratum in: FEBS Lett. May 21, 2004;566(1-3):317. PMID: 14759517 (Year: 2004).*

Shiraishi et al., Peptide nucleic acid (PNA) cell penetrating peptide (CPP) conjugates as carriers for cellular delivery of antisense oligomers. Artif DNA PNA XNA. Jul.-Dec. 2011;2(3):90-9. doi: 10.4161/adna.18739. PMID: 22567192; PMCID: PMC3324339 (Year: 2011).*

Turner et al., RNA targeting with peptide conjugates of oligonucleotides, siRNA and PNA. Blood Cells Mol Dis. Jan.-Feb. 2007;38(1):1-7. doi: 10.1016/j.bcmd.2006.10.003. Epub Nov. 17, 2006. PMID: 17113327 (Year: 2007).*

Whitehead et al., Knocking down barriers: advances in siRNA delivery. Nat Rev Drug Discov 8, 129-138 (2009). https://doi.org/10.1038/nrd2742 (Year: 2009).*

Wheeler, Radiolysis of Peptides and Proteins, Photochemistry and Photobiology, vol. 7:675-681 (1968). (Year: 1968).*

Haugen et al., Nuclear legumain activity in colorectal cancer. PLoS One. 2013;8(1):e52980. doi: 10.1371/journal.pone.0052980. Epub Jan. 10, 2013 (Year: 2013).*

Liu et al., Targeting cell surface alpha(v)beta(3) integrin increases therapeutic efficacies of a legumain protease-activated auristatin prodrug. Mol Pharm. Jan. 1, 2012;9(1):168-75. doi: 10.1021/mp200434n. Epub Nov. 22, 2011. PMID: 22044266; PMCID: PMC3277864 (Year: 2011).*

Bajjuri et al., The legumain protease-activated auristatin prodrugs suppress tumor growth and metastasis without toxicity. ChemMedChem. Jan. 3, 2011;6(1):54-9. doi: 10.1002/cmdc.201000478. PMID: 21154805; PMCID: PMC3549592 (Year: 2011).*

Liu et al.; Overexpression of legumain in tumors is significant for invasion/metastasis and a candidate enzymatic target for prodrug therapy. Cancer Res. Jun. 1, 2003;63(11):2957-64. PMID: 12782603 (Year: 2003).*

Gregory, "Human RISC Couples MicroRNA Biogenesis and Post-transcriptional Gene Silencing", Cell, vol. 123, 631-640, Nov. 18, 2005, 10 pgs.

Hu, "Allele-Selective Inhibition of Mutant Huntingtin by Peptide Nucleic Acid-Peptide Conjugates, Locked Nucleic Acid, and Small Interfering RNA", Oligonucleotide Therapeutics: Ann. N.Y. Acad. Sci. 1175:24-31 (2009), 8 pgs.

Inaba,"Atelocollagen-mediated Systemic Delivery Prevents Immunostimulatory Adverse Effects of siRNA in Mammals", www.moleculartherapy.org vol. 20 No. 2, 356-366 Feb. 2012, 12 pgs.

Lehto, "A Peptide-based Vector for Efficient Gene Transfer In Vitro and In Vivo", Moleculat Therapy vol. 19 No. 8, 1457-1467, Aug. 2011.

Minakuchi, "Atelocollagen-mediated synthetic small interfering RNA delivery for effective gene silencing in vitro and in vivo", Nucleic Acids Research, 2004, vol. 32, No. 13.

Moschos,"Lung Delivery Studies Using siRNA Conjucated to TAT(48-60) and Penetratin Reveal Peptide Induced Reduction in Gene Expression and Induction of Innate Immunity", Bioconjucate Check. 2007, 18, 1450-1459, 10 pgs.

Wagner,"New Naturally Occuring Amino Acids", Angew. Chem. Int. Ed. Engl. 22(1983) 816-828, 13 pgs.

Tam et al., Pharmaceutics 5(3): 198-507 (2013).

Dorn, A., et al., J. Virol. Feb; 79(4):2404-12 (2005).

Kun Cheng and Ram I. Mahato "Advanced Delivery and Therapeutic Applications or Rnai"; Wiley publishing group (2013)). Section 6.2.3.3.

Elbashir SM,: Duplexes of 21-nucleotide RNAs mediate RNA interferences in cultured mammalian cells, Nature, May 24, 2001, 411(6836), 494-8.

Liu T,:"Efficient and isoform-selective inhibition of cellular gene expression by peptide nucleic acids", Biochemistry, Feb. 24, 2004, 43(7), 1921-7.

* cited by examiner

PEPTIDE FOR USE IN THE REDUCTION OF SIDE EFFECTS IN THE FORM OF IMMUNOSTIMULATORY REACTIONS/EFFECTS

CROSS-REFERENCE TO RELATED APPLICATIONS

The present application is a continuation of U.S. patent application Ser. No. 15/503,810, filed on Jul. 12, 2017, which is a National Stage of International Patent Application No. PCT/EP2015/068634, filed Aug. 13, 2015, which claims priority under 35 U.S.C. § 119 of European Patent Application No. 14181072.1, filed on Aug. 14, 2014. The entire disclosures of the foregoing applications are expressly incorporated by reference herein.

The invention relates to a peptide for use in the reduction of side-effects in the form of immunostimulatory reactions/effects which occur with gene therapy, wherein the peptide is coupled to a nucleic acid molecule used in gene therapy. The invention further relates to such a peptide for use in the reduction of side-effects in the form of immunostimulatory reactions/effects which occur with gene therapy, wherein the peptide is coupled to a nucleic acid molecule, used in gene therapy, by which the immunostimulatory effects are induced and are characterized by, for example, the activation/expression of IFIT1/2, IRF9, TLR3, TLR7, TLR8 or PKR. Thus, the invention in particular relates to such a peptide for use in the reduction of side-effects in form of immunostimulatory reactions/effects which occur with gene therapy, wherein the peptide is coupled to a nucleic acid molecule used in gene therapy, wherein the immunostimulatory reactions/effects are induced by activation of IFIT1/2, IRF9, TLR3, TLR7, TLR8 or PKR.

It is known that cells can be influenced by the introduction of nucleic acids in a targeted manner. By way of example, siRNA or antisense nucleic acids can reduce the expression of genes. saRNAs allow for the enhancement gene expression, and the introduction of mRNAs allows for the production of proteins in cells. Moreover, it is described that nucleic acids having single strands, double strands, having short chains (10-30 bases) or long chains (30-10000 bases) can, for example, be used in order to influence cells. In order to enhance stability and in order to protect against nucleases, the nucleic acids can be chemically modified. For the introduction into cells and for the selectivity for particular cells, so called delivery reagents (e.g. lipids, polyethyleneimines or nanoparticles), cell-penetrating peptides, protease substrates, antibodies, antibody fragments or further structures can be bound to the nucleic acid molecules.

However, it is known that in particular with in vivo use of nucleic acids, the problem frequently occurs that immuno-regulatory effects are induced in cells and a toll-like receptor (TLR) activation takes place. As a result, expression of interferons may occur. Thereby, follow-up processes are induced in cells. This can, for example, lead to a general inhibition of expression and cytotoxicity. These cellular processes can have major implications in vivo, such as redness, inflammations, flu-like symptoms and fever.

Furthermore, there is a particular risk in vivo that by liposomal delivery strategies, for example, the nucleic acids adhere to the cell surface and thereby also extracellular TLR receptors or TLR receptors which are present in the cell membrane, are activated apart from cytoplasmic or endosomal TLR receptors, which leads to enhanced systemic effects and immune responses.

These side-effects are a major problem in the context of gene therapy, which usually aims at a targeted treatment of specific diseases by introducing nucleic acids such as DNA or (si)RNA into a subject's somatic cells. To this aim, a DNA molecule or a specific gene, which encodes a protein and which may be (over)expressed in cells, may be introduced, so as to compensate a gene defect in the endogenous gene of the cell, for example. By means of siRNA molecules, for example, the expression of a gene via the known RNA interference mechanism may be reduced or entirely eliminated, in a targeted manner, in order to treat a disease, the cause of which is, for example, a (disease-causing) expression of a particular gene.

In the prior art, these undesired side-effects occurring with gene therapy may currently be reduced at least to some extent, by chemically modifying the sugar-phosphate backbone of, e.g. siRNA by modification of MeO, for example. However, the modifications mentioned do not provide for sufficient protection from induction of non-specific effects.

Therefore, there is a need for finding means to minimize or circumvent side-effects in form of the non-specific effects as described, which occur with the use of nucleic acids.

Thus, the invention is based on the problem of providing modifications of nucleic acid sequences which minimize or circumvent said side-effects and non-specific effects.

The problem is solved by the provision of the subject matter as described in the patent claims. The invention is based on the surprising finding that by coupling a peptide to a nucleic acid molecule used in gene therapy, the immunostimulatory reactions/effects, which occur as undesired side-effects, can be significantly reduced. Thus, the invention relates to a peptide for use in the reduction of side-effects in form of immunostimulatory reactions/effects which occur with gene therapy, wherein the peptide is coupled to a nucleic acid molecule, preferably a siRNA molecule, used in gene therapy.

As described in the examples as included, it was surprisingly found in the analysis of the immunostimulatory effects of nucleic acids with the example of siRNA and siRNA modifications that the expression of genes, which are associated with a TLR reaction to siRNA, can be prevented by binding the siRNA to a peptide at the antisense strain. This is particularly surprising, since the prior art does not provide any description that coupling of peptides influences non-specific effects and side-effects in form of immunostimulatory reactions/effects, which usually occur with the use of nucleic acids in the context of gene therapy. This is important also for the reason that a minimization or elimination of side-effects which emerge in the treatment of diseases is always sought for, and the present invention offers a convenient way to minimize or circumvent side-effects in form of non-specific effects as described, which occur with the use of nucleic acid molecules, since a simple peptide coupling of the nucleic acid molecules used in gene therapy can be easily implemented.

As shown in the examples as included, the expression of IFIT1 (Interferon induced protein with tetratricopeptide repeats 1; a marker for the induction of unspecified immunostimulatory effects) by introduction of 4 different siRNA sequences (target genes AGAP, ATAP, RFWD, CHMP) into MCF7 cells is significantly enhanced. The examples show that by covalently binding a peptide (in the present example at the 5' phosphate end of the antisense strain via an amino C6 linker), a significantly reduced IFIT1 expression is detected in comparison to the siRNA which is not bound to the peptide, whereas in some cases, IFIT1 expression was similar to the expression of untreated cells. Thus, it could surprisingly be shown that irrespective of the nucleic acid and the corresponding target sequence used, coupling of the peptide resulted in the reduction of immunostimulatory reactions/effects. Moreover, the reduction of said immunostimulatory reactions does also not depend on the peptide used, since it was shown that a reduction of IFIT1 expression by means of different peptides was equally possible.

Thus, the present invention provides a peptide for the use in the reduction of side-effects in form of (non-specific) immunostimulatory reactions/effects which occur with gene therapy, wherein the peptide is coupled to a nucleic acid molecule, preferably a siRNA molecule, used in gene therapy.

The nucleic acid molecule used in gene therapy is not limited to a particular molecule or even to a specific nucleic acid sequence. Rather, any nucleic acid molecule can be used, which can or is to be used in the context of gene therapy. The choice of the nucleic acid molecule which is to be used in gene therapy depends to a high degree on the disease to be treated, which is to be treated in the context of gene therapy. Non-limiting examples are given further below.

In the field of medicine, the term gene therapy refers to the insertion or introduction of genes or nucleic acid molecules into cells or tissue of a human, in order to treat hereditary diseases, genetic defects or metabolic diseases, tumors and virus infections. With regard to the untargeted transfer, i.e. the introduction of the genes or nucleic acid molecules, various methods are known in the prior art, which, as a rule, use so called vectors to transport a therapeutic gene/nucleic acid molecule into a cell. By way of example, the genes/nucleic acid molecules can be introduced into cells by (chemical) transfection. The therapeutic genes and an electrically-charged compound (e.g. sodium phosphate) are added to the cells. The electrically charged compound disrupts the structure of the cell membrane, whereby the nucleic acid to be transferred can be transferred into the cell. By means of (physical) transfection, the nucleic acid molecule can be transferred into the cell, for example by electroporation, a particle gun or by erythrocyte ghosts. In clinical use, however, the nucleic acid molecule to be transferred is introduced into the cell via transduction. With this method, a virus transfers the therapeutic gene into the cell. With regard to transduction, multiple transport viruses are known to the skilled person. So-called retroviral systems are used the most frequently used systems.

Moreover, therapeutic genes/nucleic acid molecules, in particular with synthetically produced peptide-siRNA constructs, are introduced into cells or tissue via lipids, lipid-nanoparticles or polymers. These methods are known in the prior art. Furthermore, said constructs can be provided with or without a "core-shell-construction". A "core-shell-construction" is the option to "wrap" an active ingredient, with a negatively-charged molecule, for example (e.g. a peptide/nucleic acid molecule of the present invention, preferably an siRNA, coupled to a peptide) is wrapped in a shell of positively-charged molecules, which, in turn, is for example wrapped by another shell consisting of polyethyleneglycol (PEG). PEG is frequently used to increase the plasma half-life, since PEG is able to reduce kidney patency. In addition, these constructs can be shelled by a further layer, which allows for entering into cells. Corresponding options of providing the peptide/nucleic acid molecule constructs of the invention with a "core-shell construction" are described in the prior art. In this regard, it must be pointed to the review article by Tam et al., Pharmaceutics 5(3): 198-507 (2013), for example. Furthermore, the constructs can be integrated into PEG, which fulfills the function of a "stealth mechanism". "Stealth mechanism" relates to the possibility used when "wrapping" active ingredients in order to introduce molecules such as PEG into the external shell of the "wrapping", which are able to protect against reactions of the immune system against further molecules/proteins contained in the shell. Moreover, the constructs may have targeting molecules known in the art (such as specific antibodies, their fragments or peptides), which can recognize in a targeted manner specific cells to be treated. The person skilled in the art knows a plurality of different cell surface molecules, antigens or epitopes, for example, which are specific for particular cells or groups of cells. Thus, corresponding specific antibodies, their fragments or peptides, which are able to recognize said cell surface molecules, antigens or epitopes, may be used so that the peptide/nucleic acid molecule constructs of the invention, which are used in gene therapy, can find and recognize (and therefore can be introduced into) particular cells, into which the constructs are to be introduced, in a targeted manner.

As already set out above, side-effects in form of (non-specific) immunoregulatory or immunostimulatory effects or reactions frequently occur with nucleic acid molecules used in gene therapy. In this regard, "non-specific" means that these effects are not induced by the sequence of the nucleic acid molecule used in gene therapy. Rather, the immunostimulatory effects are induced entirely independently of the sequence and structure of the nucleic acid molecule and arise solely due to the fact that the nucleic acid molecule is present, i.e. the effects are attributed solely to the nature and structure of the nucleic acid molecule as such.

"Side-effects in form of immunostimulatory reactions or effects" relate to an induction or enhancement of an immune response, which is per se not desired and intended, respectively, in the context of the corresponding gene therapy and which is not connected to the sequence introduced. As regards the use of nucleic acids, it is known that cells, when contacted with particular free nucleic acids and nucleic acid fragments, have non-specific cellular reactions. These reactions manifest themselves in particular by immunostimulatory effects, with, for example, a toll-like receptor (TLR) activation occurring.

It is, for example, known that the IFIT1/2 gene (interferon induced-protein with tetratricopetpide repeats 1/2) may be induced by dsRNA and by INFa/b. The encoded protein IFIT1/2, in turn, recognizes ssRNA molecules.

The IRF9 gene (Interferon regulatory factor 9) is induced by INFa/b, indirectly by nucleic acids, and IRF9 itself forms part of the INF transcription activator complex. It is moreover known that TLR3 (toll-like receptor 3) recognizes dsRNA, while TLR7 (toll-like receptor 7) recognizes ssRNA and TLR8 G-rich oligonucleotides, klk (protein kinase RNA-activated; also known as protein kinase R (PKR)) is induced by dsRNA and interferon.

Thus, the (non-specific) activation of the above-mentioned genes IFIT1/2, IRF9, TLR3, TLR7, TLR8 and/or PKR can be used as an indicator as to whether immunostimulatory reactions/immunostimulatory effects within the meaning of the present invention occur by a nucleic acid molecule used in gene therapy.

As a result of the activation of said immunostimulatory reactions or effects, direct or indirect expression of interferon ensues, which induce follow-up processes in cells, which are generally undesired and associated with side-effects, since these follow-up processes are accompanied by a general inhibition of expression and/or cytotoxicity. In vivo, these cellular processes can have significant implications and manifest for example in the form of redness, inflammation, flu-like symptoms and/or fever.

As already set forth, the present invention is based on the finding that by binding a peptide to a nucleic acid molecule, preferably an siRNA, used in gene therapy, potentially occurring (non-specific) immunostimulatory reactions/effects may be reduced or eliminated. Reduction of TLR and interferon activation, respectively, of siRNA by binding siRNA to a peptide is of particular use, since in doing so, the occurrence of non-specific effects and phenotypes, which are not induced on the basis of RNA interference, can be reduced, This reduces or eliminates non-specific effects in viva, which are, for example, induced by siRNA molecules. Thus, also such sequences can be used which are highly specific for a particular mRNA, but which, due to their non-specific immunostimulatory effect, at the same time induce significant and non-specific effects and phenotypes, which is why said sequences cannot be used or can be used only in a limited manner in vivo and in vitro, since their use would induce severe side-effects.

"Reduction" of side-effects in form of immunostimulatory effects or reactions relates to a treatment, which aims at achieving a desired pharmacological and/or physiological effect. More precisely, the treatment for the "reduction" of side-effects in form of immunostimulatory effects or reactions aims at a partial or, preferably, complete cure of the diseases and/or side-effects which occur with immunostimulatory effects, or aims at completely preventing said immunostimulatory effects or reactions in the first place.

The treatment for the "reduction" of side-effects in form of immunostimulatory effects or reactions can, on the one hand, be prophylactic or, on the other hand, be an acute treatment. In the context of the present invention, it is preferred that the "reduction" of side-effects in form of immunostimulatory effects or reactions does not occur at all with the administration of the nucleic acid molecule used in gene therapy. Thus, it is preferred that the reduction of side-effects occurs concomitantly with the administration of the nucleic acid molecule used in gene therapy or does not occur at all (or only in a reduced manner). As set out above, this is done by coupling, according to the invention, a peptide to the nucleic acid molecule used in gene therapy.

Thus, in one embodiment, the present invention relates to a peptide for use in the reduction of side-effects in form of immunostimulatory reactions/effects which occur with gene therapy, wherein the peptide is coupled to a nucleic acid molecule, preferably an siRNA molecule, used in gene therapy, wherein the immunostimulatory reactions/effects are induced by activation of IFIT1/2, IRF9, TLR3, TLR7, TLR8 or PKR. Activation of IFIT1/2, IRF9, TLR3, TLR7, TLR8 or PKR means that the expression of said genes is activated. As already mentioned above, it is known that said genes (non-specifically, irrespective of the structure and/or sequence of the nucleic acid molecule) are activated if (free) nucleic acid molecules or fragments thereof occur in the cell. Therefore, the (non-specific) activation of the genes IFIT1/2, IRF9, TLR3, TLR7, TLR8 and/or PKR can be used as an indicator as to whether immunostimulatory reactions/immunostimulatory effects within the meaning of the present invention occur with a nucleic acid molecule used in gene therapy, since said immunostimulatory reactions/immunostimulatory effects are based on the activation of said genes and the IFIT1/2 pathway, IRF9 pathway, TLR3 pathway, TLR7 pathway, TLR8 pathway and/or PKR pathway, respectively. The person skilled in the art knows methods by means of which it can be established whether a nucleic acid molecule induces immunostimulatory effects or reactions, which are characterized by activation of said genes, i.e. the IFIT1/2 pathway, IRF9 pathway, TLR3 pathway, TLR7 pathway, TLR8 pathway or PKR pathway, so that the person skilled in the art is able to dearly identify and decide whether side-effects, which occur with gene therapy (induced by the nucleic acid molecule), are to be attributed to the activation of the IFIT1/2 pathway, IRF9 pathway, TLR3 pathway, TLR7 pathway, TLR8 pathway and/or PKR pathway. Accordingly, the skilled person can establish by means of the same method whether coupling to a peptide can reduce said side-effects in form of immunostimulatory reactions/effects.

Known methods to determine whether IFIT1/2, IRF9, TLR3, TLR7, TLR8 or PKR are activated are briefly described hereinafter.

Whether IFIT1/2, IRF9, TLR3, TLR7, TLR8 or PKR is activated and, thus, whether a corresponding immunostimulation occurs, can, for example, be identified by analysis of the gene expression by IFIT1/2, IRF9, TLR3, TLR7, TLR8 or PKR, since when said genes are activated, a new expression or an increase of expression of said genes always ensues. Thus, immunostimulatory reactions/effects can be detected, if a new expression of IFIT1/2, IRF9, TLR3, TLR7, TLR8 or PKR is found. The skilled person knows a plurality of methods of how to detect whether a gene is expressed. A quantitative PKR is frequently used, which initially involves isolating the mRNA from the cells or tissues to be analyzed. The mRNA is transcribed in a cDNA by means of reverse transcription. By means of suitable primers, which are specific for IFIT1/2, IRF9, TLR3, TLR7, TLR8 or PKR, the DNA can be amplified via a PCR reaction, wherein the relative or, dependent on a DNA standard, the absolute amount of original mRNA of the gene to be analyzed can be calculated based on the DNA amplification of the gene to be analyzed as compared to a reference gene. The skilled person knows such methods for the quantification of mRNA, by means of which the new expression or increase of expression of IFIT1/2, IRF9, TLR3, TLR7, TLR8 or PKR can be determined. Other methods do not determine mRNA expression at mRNA level, but rather determine the new expression or the increase of expression of IFIT1/2, IRF9, TLR3, TLR7, TLR8 or PKR at protein level. By way of example, the (increase or new synthesis of the) protein amount of IFIT1/2, IRF9, TLR3, TLR7, TLR8 or PKR can be determined by western blot analysis.

Immunostimulatory reactions/effects in accordance with the foregoing are given (or are detected) if expression of IFIT1/2, IRF9, TLR3, TLR7, TLR8 and/or PKR is increased by the presence of the nucleic acid molecule used in gene therapy by preferably at least 1.2 times, 1.5 times or 2 times in the above-mentioned test methods, as compared to a control which does not have the nucleic acid molecule used in gene therapy. In a further embodiment, immunostimulatory reactions/effects are given or are detected if the expression of IFIT1/2, IRF9, TLR3, TLR7, TLR8 and/or PKR is increased by the presence of the nucleic acid molecule used in gene therapy by preferably at least 2.5 times, 5 times or 10 times in the above-mentioned test methods as compared to a control which does not have the nucleic acid molecule used in gene therapy. In a further embodiment, immunostimulatory reactions/effects are given or are determined if the expression of IFIT1/2, IRF9, TLR3, TLR7, TLR8 and/or PKR is increased by the presence of the nucleic acid molecule used in gene therapy by preferably at least 15 times, 20 times, 30 times or 50 times in the above-mentioned test methods as compared to a control which does not have the nucleic acid molecule used in gene therapy. In the prior art, an increase of expression by 15 times is regarded as a critical value, starting from which, an immunostimulatory reaction/an immunostimulatory effect is given (Dorn, A., et al., J. Virol. February; 79(4):2404-12 (2005)). Thus, in a preferred embodiment, immunostimulatory reactions/effects are given or are detected if the expression of IFIT1/2, IRF9, TLR3, TLR7, TLR8 and/or PKR is increased by the presence of the nucleic acid molecule used in gene therapy by at least 15 times in the above-mentioned test methods as compared to a control which does not have the nucleic acid molecule used in gene therapy.

In a further embodiment, the present invention relates to a peptide for use in the reduction of side-effects in form of immunostimulatory reactions/effects which occur with gene therapy, wherein the peptide is coupled to a nucleic acid molecule, preferably an siRNA molecule, used in gene therapy, wherein the immunostimulatory reactions/effects lead to redness, inflammation, flu-like symptoms and/or fever.

In a preferred embodiment, the peptide which is coupled to a nucleic acid molecule is specifically cleavable by enzymes. The prior art describes such nucleic acid molecules, which are coupled to peptides which are specific for particular proteases. Furthermore, methods are described, as to how said peptides can be coupled to nucleic acid molecules. It is described, for example, that by binding short peptides, which are cleaved cell-specifically, a defined cell specificity can be achieved (WO 2008/098569 A2). Using the example of siRNA molecules, it was shown that by using siRNA molecules modified in such a way, the expression of genes can be selectively reduced or eliminated in particular cells, while in other cells, which do not have corresponding cell-specific proteases, the activity of said siRNA molecules is not released since the peptides remain bound to the siRNA molecules (in an inhibitory manner).

Cleavage by specific enzymes can in particular be induced by the fact that said specific enzymes are, for example, (only) active with specific states of disease or states of cell development (in particular cell cycle or differentiation of stem cells). These enzymes can also be specific for particular cell types or disease-related modification of the cells (in particular with degeneration or infection). The enzymes can also show activity specific to their genotype. Moreover, a specific cleavage can occur for the purpose of detection of particular enzymes for the purpose of the applications mentioned.

Specific enzymes can be, for example, proteases or peptidases (caspases, aminopeptidases or serineproteases; for example Caspase-1, Caspase-2, Caspase-3, Caspase-4, Caspase-5, Caspase-6, Caspase-7, Caspase-8, KLK4, PLAP, IRAP, uPA, FAP-α, Legumain or viral proteases such as HIV protease, coxsackievirus protease, Epstein-Barr virus protease, hepatitis-A, -B, -C virus protease), nucleases, glycosidases, saccharases or chitinases, wherein these are non-limiting examples. The person skilled in the art knows a plurality of specific peptide sequences as well as the corresponding proteases or peptidases, nucleases, glycosidases, saccharases or chitinases, which can specifically recognize and cleave said peptide sequences.

Between the nucleic acid molecule and the peptide which can be specifically cleaved an amino Cn linker (with Cn=C1, C2, C3, C4, C5 or C6), for example a amino C6 linker, can also be covalently coupled to the peptide at the 3' end and/or 5' end of the nucleic acid molecule. This covalent bond is able to inactivate the nucleic acid molecule, preferably the siRNA molecule. If the nucleic acid molecule is an siRNA, no inhibition of a specific gene expression occurs after transfection of such inactive siRNA molecules, as long as even only one of the bound peptides remains coupled to the siRNA molecules due to the absence of the corresponding enzyme typical for the target cell. In order to activate the nucleic acid molecules, preferably the siRNA, the peptide can then be cleaved from the siRNA, while the amino Cn linker and potentially a peptide residue remain coupled to the siRNA. Such linkers are, for example, described in WO2010/102615.

In another embodiment, the present invention relates to a peptide for use in the reduction of side-effects in form of immunostimulatory reactions/effects which occur with gene therapy, wherein the peptide is coupled to a nucleic acid molecule, preferably a siRNA molecule, used in gene therapy, wherein the peptide is non-specifically cleavable, preferably by modification of the pH value. Corresponding methods are known and described in the prior art (see, for example, Kun Cheng and Ram I. Mahato "Advanced Delivery and Therapeutic Applications of RNAi"; Wiley publishing group (2013)). Section 6.2.3.3, for example, describes enzymatically cleavable linker and section 6.2.3.4 describes acid-labile linker.

In another embodiment, the present invention relates to a peptide for use in the reduction of side-effects in form of immunostimulatory reactions/effects which occur with gene therapy, wherein the peptide is coupled to a nucleic acid molecule, preferably a siRNA molecule, used in gene therapy, wherein the nucleic acid molecule comprises further chemical modifications.

By way of example, the peptide, which is coupled to the nucleic acid molecule, or the nucleic acid molecule itself, which is used in gene therapy, can be bound to molecules, e.g. for better transport into and to the cells, respectively (for example nanoparticles as carrier system) as well as for stabilization or detection (for example fluorochrome for detection).

As already set forth above, the skilled person knows methods as to how the nucleic acid molecule, which is used in gene therapy, can (specifically) get to the target site, i.e. to or into a desired target cell. To this aim, the peptide/nucleic acid molecule complexes according to the present invention can, for example, be introduced into cells in a manner per se known via delivery mechanisms. The delivery mechanisms used can have cell selectivity and be bound to the nucleic acids either in an unbound/complexing manner or also covalently. The peptides itself can also act as delivery mechanisms or can support the delivery process as a whole (entering the cell and transition into cytoplasm) or part of the process (e.g. transfer from endosome into cytoplasm).

By a suitable transfection system, for example nanoparticles, polyethyleneimine or liposomes, the peptide/nucleic acid molecule constructs of the invention can be introduced into the cells in a manner also known per se.

The nature of the peptide of the present invention, which is coupled to a nucleic acid molecule used in gene therapy, is not limited to a specific peptide or a specific peptide sequence. Rather, as already mentioned above, the examples were able to show that coupling a peptide influences the non-specific effects, which usually occur with the use of nucleic acids in the context of gene therapy, irrespective of the nature of the peptide used. As mentioned, it was shown that said (non-specific) immunostimulatory effects/reactions can be significantly reduced by the binding of a peptide. The reduction does not depend on the structure or the sequence of the peptide used. Therefore, the nature of the peptide does not appear to be of major importance. Rather, according to the invention, a peptide having any sequence and any length can be used.

A peptide used according to the invention is an organic compound which contains peptide bonds between amino acids and which can be regarded as a small protein. The single amino acids are connected to form a chain in a defined order (sequence) and in a usually linear manner and, can, however, also be present in a branched or circular manner. A peptide bond is an amide-like bond between the carboxy group of an amino acid and the amino group of the α carbon atom (α C atom) of a second amino acid. Two amino acids can condense to form a dipeptide (formally) under dehydration. Tripeptides, tetrapeptides, oligopeptides and ultimately polypeptides form by means of multiple condensation. Peptides are usually chain-like macromolecules constituted by amino acids. Peptides are different to proteins in particular as regards their molar masses, i.e. the number of linked amino acids. There is no clear limitation; having more than approximately 100 linked amino acids, the molecule is referred to as a protein, but can also be understood as a peptide in the context of the present invention. A peptide according to the invention can consist of 2 amino acids (dipeptide), 3 amino acids (tripeptide), 4 amino acids (tetrapeptide) or 5 amino acids (pentapeptide). It is preferred that the peptide consists of up to 10 amino acids, that is between 2 and 10 amino acids and is then referred to as oligopeptide. In another preferred embodiment, the peptide may consist of between 10 and 100 amino acids, which is of up to 15, 20, 30, 40, 50, 60, 70, 80, 90 or 100 amino acids and is then referred to as polypeptide. However, in another embodiment, the peptide can also have more than 100 amino acids, for example up to 150, 200 or 300 amino acids, In another preferred embodiment, the peptide consists of up to 12 amino acids, preferably between 4 and 12 amino acids.

As already mentioned, the sequence of the peptide is not essential for the present invention. This is why any (non-specific) amino acid sequence can be used as a peptide according to the invention. In a preferred embodiment, however, specific peptide sequences can be selected, for example in order to allow for specific cleavage of the peptide from the nucleic acid molecule used in gene therapy. The peptide sequence corresponds to a cleavage sequence for corresponding peptidases. As already set forth above, such constructs are described in the prior art. Methods are described by means of which cell specificity can be achieved by binding short peptides, which are cleaved in a cell-specific manner (WO 2008/098569 A2). This is advantageous in particular if siRNA molecules are used, By binding corresponding peptide sequences to the nucleic acid molecule, preferably a siRNA molecule, which is used in gene therapy, a reduction or elimination of gene expression in particular cells can be achieved in a selective manner.

Corresponding specific sequences (as well as the corresponding peptidases, which recognize and are able to cleave said sequences) are known to the skilled person and the sequence of the peptide according to the invention, which is coupled to a nucleic acid molecule used in gene therapy, is not limited to a specific peptide sequence.

As shown in the examples, peptides having a length of 4 to 12 amino acids with known cleavage sites (or new cleavage sites, which are not described in the prior art) were tested for cellular proteases. However, the present invention is not limited to the specific peptides.

Thus, the coupled peptides can further contain target sequences of proteases and/or can be activated in a targeted manner in target cells in form of also known prodrug applications. Prodrug applications relate to the possibility to purposefully use immunostimulation induced by the nucleic acid molecules, for example in order to induce cell-death in cells a targeted manner. This can be achieved, for example, by the peptide/nucleic acid molecule constructs according to the invention, which are designed in such manner that the immune system is locally stimulated by targeted cleavage of the peptide in particular target cells. It is known that the organism uses and activates the immune system in a targeted manner if individual cells are to die. This can be achieved, for example, by use of the peptide/nucleic acid molecule constructs according to the invention, so that a virus-infected host cell dies in a targeted and reliable manner. The reason for the targeted death is that in the target cell, the peptide which protects against immune responses is selectively cleaved from the nucleic acid molecule, such as siRNA, and thus, a TLR-induced stress reaction (which occurs per se with standard nucleic acids) occurs in the target cell. The cellular stress leads to the cell's death and thereby viral proteins and DNA/RNA of the virus are released, to which the immune system reacts (locally). Moreover, the released nucleic acid molecules of the invention additionally contribute to cellular immunostimulation (for example by T cells) upon cleavage of the peptides. In that way, the immune system is locally stimulated. Thus, according to the invention, the coupling of peptides can be used to inhibit the immunostimulatory effect of the nucleic acid molecules (for example in cells which are not infected with a virus), on the one hand, and to subsequently release them in several cells or cell populations (and only there) in a targeted manner by cleaving, and to induce immunostimulatory effects caused by (free) nucleic acid molecules. This can be done in virus-infected cells in order to activate (and support) the immune system in the relevant tissues, while in other non-infected cells, the peptide is not cleaved. The prior art describes how defined cell specificity can be achieved by binding short peptides, which can be cleaved in a cell-specific manner (WO 2008/098569 A2). Thus, it is possible that the binding of the peptide to nucleic acid molecule according to the invention can be used in order to induce desired immunostimulatory effects in particular cells in a targeted manner (by specific cleavage of the peptide in said cells), while the nucleic acid molecule released in this way, for example an siRNA, can have an additional (sequence-specific) processing/inhibitory effect on the expression of the viral DNA/RNA/protein molecules, for example via the RNA interference mechanism. In a similar manner, peptide-coupled nucleic acid molecules can be used with tumor diseases, in which the immune system is usually not activated or in which cells of the immune system do not recognize the tumor cells. Systemically administered peptide/nucleic acid molecules of the invention can be designed such that the peptides are cleaved in tumor cells only, aiming at targeted induction of a local immunostimulation in the tumor cells by the free nucleic acid molecules. Both mechanisms for the induction of cell specificity can also be applied in combination.

In a further embodiment, the present invention relates to a peptide for use in the reduction of side-effects in form of immunostimulatory reactions/effects which occur with gene therapy, wherein the peptide is coupled to a nucleic acid molecule, preferably an siRNA molecule, used in gene therapy, wherein the peptide comprises the cleavage sequence for Legumain (cleavage sequence: Ala-Ala-Asn), Caspase-4 (cleavage sequence: Leu-Glu-Val-Asp-Gly; SEQ ID NO:1), uPA (cleavage sequence: Glu-Gly-Arg), Fap (cleavage sequence: Gly-Pro), KLK (cleavage sequence:

Val-Gln-Gln-Lys-Ser; SEQ ID NO:2), FLAP (cleavage sequence: Pro-His-Ile-Tyr-Val; SEQ ID NO:3), Cathepsin-E (cleavage sequence: Gly-Gly-Ala-Phe-Leu-Val-Leu-Pro; SEQ ID NO:4; and cleavage sequence: Ala-Leu-Ala-Phe-Ser-Leu-Ala-Ala; SEQ ID NO:5 respectively), CMV protease (cleavage sequence: Pro-Ser-Val-Ser-Ala; SEQ ID NO:6), or EBV protease (cleavage sequence: Gly-Ser-Ala-Ser-Ala, SEQ ID NO:7).

The localization of the peptide is not important in this context. The peptide can be coupled to either the 5' end and/or the 3' end of the nucleic acid molecule. If the nucleic acid molecule is an siRNA, the coupling of peptides as described is not limited to the 5' position of the backbone of the antisense strain of siRNA. For peptide-coupling, the 3' position of the nucleic acid backbone, binding to the base or to the backbone between two nucleotides can be used. In the case of double-stranded nucleic acids, binding to the sense strain is also possible. With nucleic acid analogues, binding of peptides to the ends, the bases or the backbone is possible. The person skilled in the art knows methods as to how peptides can be coupled to nucleic acid molecules.

The peptide which is coupled to a nucleic acid molecule is not limited to the specific cleavage sequence for Legumain (cleavage sequence: Ala-Ala-Asn), Caspase-4 (cleavage sequence: Leu-Glu-Val-Asp-Gly; SEQ ID NO:1), uPA (cleavage sequence: Glu-Gly-Arg), Fap (cleavage sequence: Gly-Pro), KLK (cleavage sequence: Val-Gln-Gln-Lys-Ser; SEQ ID NO:2), FLAP (cleavage sequence: Pro-His-Ile-Tyr-Val: SEQ ID NO:3), Cathepsin-E (cleavage sequence: Gly-Gly-Ala-Phe-Leu-Val-Leu-Pro; SEQ ID NO:4; and cleavage sequence: Ala-Leu-Ala-Phe-Ser-Leu-Ala-Ala: SEQ ID NO:5 respectively), CMV protease (cleavage sequence: Pro-Ser-Val-Ser-Ala: SEQ ID NO:6), or EBV protease (cleavage sequence: Gly-Ser-Ala-Ser-Ala, SEQ ID NO:7). Rather, the sequences can have modifications and carry, for example, protection groups which protect against a non-specific degradation of the peptide sequences. Said sequences can also have modifications, which are necessary for their binding and coupling, respectively, to the nucleic acid molecule.

In particular, as described hereinafter, the peptide can also be modified, since in a further embodiment, the peptide which is coupled to a nucleic acid molecule is not limited to the specific cleavage sequence for Legumain (cleavage sequence: Ala-Ala-Asn), Caspase-4 (cleavage sequence: Leu-Glu-Val-Asp-Gly, SEQ ID NO:1), uPA (cleavage sequence: Glu-Gly-Arg), Fap (cleavage sequence: Gly-Pro), KLK (cleavage sequence: Val-Gln-Gln-Lys-Ser; SEQ ID NO:2), FLAP (cleavage sequence: Pro-His-Ile-Tyr-Val; SEQ ID NO:3), Cathepsin-E (cleavage sequence: Gly-Gly-Ala-Phe-Leu-Val-Leu-Pro; SEQ ID NO:4; and cleavage sequence: Ala-Leu-Ala-Phe-Ser-Leu-Ala-Ala; SEQ ID NO:5 respectively), CMV protease (cleavage sequence: Pro-Ser-Val-Ser-Ala; SEQ ID NO:6), or EBV protease (cleavage sequence: Gly-Ser-Ala-Ser-Ala, SEQ ID NO:7) as well as the above-described modifications. Rather, the cleavage sequence can be a sequence, which comprises a deletion(s), substitution(s), and/or insertion(s) of 1 to 10 amino acids in the sequence, which are selected from the group consisting of Ala-Ala-Asn, SEQ ID NO:1, Glu-Gly-Arg, Gly-Pro, SEQ ID NO:2, SEQ ID NO:3, SEQ ID NO:4, SEQ ID NO:5, SEQ ID NO:6 and SEQ ID NO:7, and which can be cleaved by the corresponding protease. The number of deletion(s), substitution(s) and/or insertion(s) is not limited. In a preferred embodiment, the cleavage sequence comprises a sequence, which comprises a deletion, substitution and/or insertion of 1 to 2 amino acids in the sequence which is selected from the group consisting of Ala-Ala-Asn, SEQ ID NO:1, Glu-Gly-Arg, Gly-Pro, SEQ ID NO:2, SEQ ID NO:3, SEQ ID NO:4, SEQ ID NO:5, SEQ ID NO:6 and SEQ ID NO:7, and which can be cleaved by the corresponding protease, i.e. Legumain, Caspase-4, uPA, Fap, KLK, FLAP, Cathepsin-E, CMV protease or EBV protease. In another preferred embodiment, the cleavage sequence comprises a sequence, which comprises a deletion, substitution and/or insertion of 1 to 3 amino acids in the sequence which is selected from the group consisting of Ala-Ala-Asn, SEQ ID NO:1, Glu-Gly-Arg, Gly-Pro, SEQ ID NO:2, SEQ ID NO:3, SEQ ID NO:4, SEQ ID NO:5, SEQ ID NO:6 and SEQ ID NO:7, and which can be cleaved by the corresponding protease, i.e. Legumain, Caspase-4, uPA, Fap, KLK, FLAP, Cathepsin-E, CMV protease or EBV protease. In another preferred embodiment, the cleavage sequence comprises a sequence, which comprises a deletion, substitution and/or insertion of 1 to 5 amino acids in the sequence which is selected from the group consisting of Ala-Ala-Asn, SEQ ID NO:1, Glu-Gly-Arg, Gly-Pro, SEQ ID NO:2, SEQ ID NO:3, SEQ ID NO:4, SEQ ID NO:5, SEQ ID NO:6 and SEQ ID NO:7, and which can be cleaved by the corresponding protease, i.e. Legumain, Caspase-4, uPA, Fap, KLK, FLAP, Cathepsin-E, CMV protease or EBV protease. In another preferred embodiment, the cleavage sequence comprises a sequence, which comprises a deletion, substitution and/or insertion of 1 to 8 amino acids in the sequence which is selected from the group consisting of Ala-Ala-Asn, SEQ ID NO:1, Glu-Gly-Arg, Gly-Pro, SEQ ID NO:2, SEQ ID NO:3, SEQ ID NO:4, SEQ ID NO:5, SEQ ID NO:6 and SEQ ID NO:7, and which can be cleaved by the corresponding protease, i.e. Legumain, Caspase-4, uPA, Fap, KLK, FLAP, Cathepsin-E, CMV protease or EBV protease. In a preferred embodiment, the cleavage sequence comprises a sequence, which comprises a deletion, substitution and/or insertion of 1 to 10 amino acids in the sequence which is selected from the group consisting of Ala-Ala-Asn, SEQ ID NO:1, Glu-Gly-Arg, Gly-Pro, SEQ ED NO:2, SEQ ID NO:3, SEQ ID NO:4, SEQ ID NO:5, SEQ ID NO:6 and SEQ ID NO:7, and which can be cleaved by the corresponding protease, i.e. Legumain, Caspase-4, uFA, Fap, KLK, FLAP, Cathepsin-E, CMV protease or EBV protease. It is only important that the resulting peptide modified in this manner can be cleaved by the corresponding protease, i.e. by Legumain, Caspase-4, uFA, Fap, KLK, FLAP, Cathepsin-E, CMV protease or EBV protease.

The skilled person can readily test by methods known in the art whether a correspondingly modified cleavage sequence can be cleaved by the corresponding protease. The cleavage sequence is not limited to the above-mentioned specific sequences or to sequences which are modified by deletion, substitution, insertion. Rather, the cleavage sequence comprises a sequence comprising one or more addition(s) of amino acids in the sequence which are selected from the group consisting of Ala-Ala-Asn, SEQ ID NO:1, Glu-Gly-Arg, Gly-Pro, SEQ ID NO.2, SEQ ID NO:3, SEQ ID NO:4, SEQ ID NO:5, SEQ ID NO:6 and SEQ ID NO:7, and which can be cleaved by the corresponding protease, i.e. by Legumain, Caspase-4, uFA, Fap, KLK, FLAP, Cathepsin-E, CMV protease or EBV protease. The addition of amino acid(s) can be either at the N-terminal end or at the C-terminal end of the peptide. The added amino acid(s) comprise up to 0 (no addition), 1, 2, 3, 4, 5, 6, 7, 8, 9 or 10 amino acids, preferably up to 20 amino acids or more, preferably up to 30 amino acids. Since, in general, the addition of amino acids has little or no impact on the above-mentioned functional properties of the cleavability of the peptides, the amino acids added may have a length of up to 40, 50, 60, 70, 80, 90 or 100 amino acids and more, up to 200, 300, 400 or 500 amino acids.

Methods for synthesizing peptides are known to the person skilled in the art. Thus, the peptide of the present invention can be produced recombinantly or synthetically by (chemical) peptide synthesis. The person skilled in the art can also modify, without difficulty, single or several amino acids in a sequence by targeted mutagenesis in order to achieve the above-mentioned modifications.

As already mentioned, the peptide of the invention is coupled to the nucleic acid molecule used in gene therapy. The person skilled in the art knows methods how peptides may be coupled to nucleic acid molecules. This can, for example, take place via a peptide bond. A peptide bond is understood to be the chemically covalent binding of molecules to nucleic acids which contain at least one peptide bond. As already mentioned above, the binding can take place via linker molecules. These linker molecules can be broken up by external factors (for example by the change of the pH value) or can be enzymatically cleavable.

As explained in more detail in the following, the nucleic acid molecule that is coupled to a peptide within the meaning of the invention is not limited to a specific nucleic acid molecule or a specific nucleic acid molecule species and the coupling of the peptide of the invention can, for example, take place with siRNA, shRNA, saRNA, miRNA or further forms of RNA as well as in form of DNA, RNA or further nucleotide analogues in common or chemically modified form with or without spatial structure, aptamers or mixed RNA/DNA sequences.

Thus, in accordance with the foregoing, when used to reduce the side effects in form of immunostimulatory reactions/effects occurring with gene therapy, the peptide can, for example, also be used with short nucleic acids (for example saRNA) or long nucleic acids (for example miRNA, mRNA, dicer substrates, PNA and DNA). The nucleic acids mentioned correspond to a selection, however, the invention is not limited to these. Nucleic acids within the meaning of the invention are understood to be single- or double-stranded RNA, DNA, mixed RNA-DNA sequences, chemically modified or unmodified RNA/DNA, with or without single-stranded overlaps, DNA or RNA with spatial structure. Dicer substrates or aptamers as well as nucleic acid analogues (for example PNA). Moreover, further molecules can be bound to the nucleic acids in order to achieve a functionality (tracer, analysis, cell targeting, endosomal escape, cell penetration, serum stability, nuclease stability etc.).

For this reason, in a further embodiment, the present invention relates to a peptide for use in the reduction of side-effects in form of immunostimulatory reactions/effects occurring in gene therapy wherein the peptide is coupled to a nucleic acid molecule used in gene therapy, wherein the nucleic acid is selected from the group consisting of mRNA, siRNA, miRNA, saRNA, RNA, PNA, DNA LNA, mixtures of different nucleotides and aptamers. The coupling of peptides to single nucleotides (which may optionally be present in mixtures) according to the invention is, for examples, advantageous if these nucleotides are incorporated in a larger molecule, e.g. in a polymer complex, in order to create a charge equilibrium. Individual nucleotide molecules incorporated in such a polymer complex may induce an undesired immune reaction which a can be prevented by the coupling according to the invention.

In a preferred embodiment, the nucleic acid molecule is an siRNA.

As already mentioned above, the nature of the nucleic acid molecule is not limited to specific nucleic acid molecule species and can be any nucleic acid molecule used in gene therapy. Thus, the single- or double-stranded nucleic acid molecule of the invention can be an mRNA, siRNA, saRNA, RNA, PNA, DNA, LNA, mixtures of different nucleotides and aptamers. mRNA, siRNA, miRNA, saRNA, RNA, PNA, DNA and LNA are known to the person skilled in the art. Thus, the nucleic acid molecule of the invention can be a single- or double-stranded nucleic acid molecule. However, it can be an aptamer or SPIEGELMER L-ribonucleic acid aptamers as well. Furthermore, the nucleic acid molecule of the invention is not only provided in the form of one of the aforementioned individual nucleic acid species. Rather, in a preferred embodiment, mixtures or mixed forms of individual species (mRNA, siRNA, miRNA, saRNA, RNA, PNA, DNA, LNA, aptamer and/or SPIEGELMER L-ribonucleic acid aptamers which, according to the invention, are coupled to a peptide, are also used.

The term "aptamer" comprises short single-stranded DNA or RNA oligonucleotides which are capable of binding a specific molecule via their three-dimensional structure. The trademark SPIEGELMER is for L-ribonucleic acid aptamers (short: L-RNA aptamers). L-ribonucleic acid aptamers are molecules similar to ribonucleic acid (RNA) which are constituted by unnatural L-ribonucleic acids. They are artificial oligonucleotides and stereochemical mirror images of natural oligonucleotides. Thus, L-ribonucleic acid aptamers are a specific form of aptamers and, like these, they are able of binding specific molecules via their three-dimensional structure. L-ribonucleic acid aptamers are known under the trade name SPIEGELMER. As already mentioned, in a preferred embodiment, the nucleic acid molecule is provided in form of an siRNA.

The use of siRNA in gene therapy is a preferred molecular-biological approach to purposefully influence cells. To this aim, short double-stranded RNA molecules are used. Classically, these so-called siRNA (English: short interfering RNA) molecules are able to interact after their activation with the mRNA of the target gene that is specifically to be inactivated in gene therapy and together with specific endoribonucleases, they form an RNA/protein complex referred to as "RISC" (RNA induced silencing complex). The RISC complex binds to the target mRNA with the endonucleases cleaving the target RNA. In this way, gene expression is prevented and, thus, the formation of target proteins is inhibited. The inhibition of gene expression by introducing short (19-23 bp), double-stranded RNA molecules (siRNA) in eukaryotic cells which are specific for a sequence fragment of the mRNA of a target gene was already described (Elbashir S M et al.: Duplexes of 21-nucleotide RNAs mediate RNA interference in cultured mammalian cells, Nature, 2001, May 24, 411(6836), 494-8; Liu Y et al.: Efficient and isoform-selective inhibition of cellular gene expression by peptide nucleic acids, Biochemistry, 2004 Feb. 24, 43(7), 1921-7; U.S. Pat. Nos. 5,898,031 A; 7,056,704 B2). The use of such molecules does not prevent the transcription of a gene and the production of an mRNA, but the siRNA initiates a cell-inherent mechanism degrading the target mRNA. Ultimately, as described before, the formation of a specific protein is suppressed without affecting the expression of further genes (post-transcriptional gene silencing).

There is no limitation regarding the nature or the sequence of the siRNA molecule which, in the present invention, is coupled to a peptide in order to be used in the reduction of side-effects in form of immunostimulatory reactions/effects occurring with gene therapy. Rather, the selection of the sequence of the siRNA molecule depends on the gene which is to be influenced by gene therapy (within the meaning of a reduction or elimination of the expression of the relevant gene via the siRNA mechanism as described above).

In a preferred embodiment, the present invention relates to a peptide for use in the reduction of side-effects in form of immunostimulatory reactions/effects occurring with gene therapy, wherein the peptide being coupled to a nucleic acid molecule used in gene therapy, wherein the siRNA comprises a nucleotide sequence selected from the group consisting of:

```
Polo-like kinase (PLK);
                                 SEQ ID NO: 8)
(5-3) UCA UAU UCG ACU UUG GUU GCC;

(SEQ ID NO: 9)
(5-3) UCA AAC UCC AUC AUG AUC U
and/or (CHMP)
                                 (SEQ ID NO: 10)
(5-3) UCC AUC AUG AUC UUC UGG A;

(PDCD)
                                 (SEQ ID NO. 11)
(5-3) UUC AUA AAC ACA GUU CUC C;

(RFWD)
                                 (SEQ ID NO: 12)
(5-3) UCA AAU UGA GGC ACU GUG C;

(SEQ ID NO: 13)
(5-3) UUU CUU CAG AGC AGG AGC A, (SEQ ID NO: 14)
(5-3) AUA CAC ACC CUU UGC CUC A
and/or (ATAP)
                                 (SEQ ID NO: 15)
(5-3) AUU UCA GGC UCA UAU UCC U;

(SEQ ID NO: 16)
(5-3) CAC AAU UCC CAC UUU GAG C, (SEQ ID NO: 17)
(5-3) GUU ACC CAC AAU UCC CAC U
and/or (AGAP)
                                 (SEQ ID NO: 18)
(5-3) UUU CUU CUC UUU GUC UGG G;
and (RCHY)
                                 (SEQ ID NO: 19)
(5-3) UAU UCU CCA AAC AAU GUG C.
```

The above siRNA molecules are specific for the target genes PLK, CHMP, PDCD, RFWD, ATAP, AGAP and RCHY, respectively. The sequences were chosen in such a manner that they advantageously bind with a nucleotide sequence to a single selected region of the relevant mRNA, which statistically is very rarely subject to a mutation and thus, in the case of increased mutations rates in the overall genome, reliably kill the cell without further mRNA binding or other action on the cell being necessary with nucleic acids being particularly preferred which contain siRNA sequences that are specific for the target genes PLK, CHMP, PDCD, RFWD, ATAP and AGAP, in order to inhibit their expression. These particularly preferred nucleic acid molecules of the present invention are mentioned and described in more detail above. It was shown that with siRNA sequences for these genes, turning-off ("silencing") the expression results in toxic effects without the cells becoming resistant to treatment with the corresponding siRNAs even upon prolonged use of the same siRNA sequence. This is advantageous, especially since for example upon interference with tumor cells using siRNA, mutations may occur whereby a specific siRNA becomes ineffective and, thus, the cells are provided with a growth advantage and cell division is intensified. This was surprisingly not observed when specific sequences were used for the aforementioned genes.

This does not only include nucleic acid molecules which comprise the above-mentioned sequences SEQ ID NO:8 to 19. Rather, it is possible to also use sequences in which only few (i.e. up to 1, 2 or 3) nucleotides are deleted, substituted or inserted in the above-mentioned sequences SEQ ID NO:8 to 19. Moreover, the sequences of the nucleic acid molecules may have a length of 10-300 bp or a length of 10-300 bases in the case of single strands with the nucleotides added, as long as they comprise the above-mentioned sequences of SEQ ID NO:8 to 19. Thus, up to 1, 2 or 3 nucleotides can be added to sequences of SED ID NO:8 to 19 at the 5' and/or 3' end. In a further embodiment, up to 5, 7, 10, 20, 30, 40, 50, 60, 70, 80, 90 or 100 or more nucleotides can be added to the sequences of SED ID NO:8 to 19 at the 5' and/or 3' end. In particular, such nucleic acid molecules which have a length of more than 18, of more than 19 or of more than 20 or preferably of more than 21 bases are also comprised. Such nucleic acid molecules having a length of more than 25 bases are preferred with all nucleic acid molecules mentioned above comprising the sequences of SEQ ID NO:8 to 19.

In a further preferred embodiment, the nucleic acid molecules within the meaning of the invention have a length of more than 30, 40, 50 or more bases. The invention also provides nucleic acid molecules which have a length within the range of 21 to 10,000 bases. Lengths of the nucleic acid molecules of the invention which are in the range of 18, 19, 20, 21, 22, 23, 25, 30, 40 or 50 to 100 or which are within the range of 18, 19, 20, 21, 22, 23, 25, 30, 40 or 50 to 200 or which are within the range of 18, 19, 20, 21, 22, 23, 25, 30, 40 or 50 to 300 bases, in particular within the range of 23 to 100 bases.

In a preferred embodiment, the present invention relates to a peptide for use in the reduction of side-effects in form of immunostimulatory reactions/effects which occur with gene therapy, wherein the peptide is coupled to a nucleic acid molecule, preferably an siRNA molecule, used in gene therapy, with the peptide/nucleic acid construct being covalently or non-covalently bound to molecules such as cell-penetrating peptides, and/or enzyme substrates, and/or to reagents such as polyethyleneimines, nanocontainers, nanoparticles or lipids, and/or to receptor-ligand complexes for introduction into cells and/or for targeted introduction into specific cells. These modifications are known to the person skilled in the art and can be used to transfer the peptide/nucleic acid constructs into specific cells in a targeted manner.

The person skilled in the art knows methods how the peptide/nucleic acid construct, can be covalently or non-covalently bound to molecules such as cell-penetrating peptides, and/or enzyme substrates, and/or to reagents such as polyethyleneimines, nanocontainers, nanoparticles or lipids, and/or to receptor-ligand complexes for their introduction into cells and/or for achieving cell specificity of the nucleic acid molecules. The molecules mentioned can be bound/coupled to the peptide and/or the nucleic acid molecule or the present invention. In this context, covalent or non-covalent bonds can be used which are known to the person skilled in the art in the context of known methods of chemical coupling reactions.

The peptide of the invention is used in the reduction of side-effects in form of immunostimulatory reactions/effects which occur with gene therapy wherein the peptide is coupled to a nucleic acid molecule, preferably an siRNA molecule, used in gene therapy. In other words, the peptide which is coupled to a nucleic acid molecule used in gene therapy is used (therapeutically) as a medicament or pharmaceutical composition. For example, for therapeutic applications, cells can be directly killed by means of the nucleic acid molecules of the invention, for example by targeted use of corresponding siRNA molecules. Thus, it is, for example, possible to kill specifically tumor cells or virus-infected cells in a targeted manner. For this reason, the nucleic acid molecules suggested can be used in the treatment and/or prophylaxis of tumor diseases or virus-induced diseases. Virus-induced diseases within the meaning of the invention comprise diseases which are, for example, induced by herpes viruses, papilloma viruses or human immunodeficiency viruses (HIV). Thus, virus-induced diseases comprise diseases such as hepatitis, cervical cancer or AIDS.

The present invention also comprises nucleotide molecules for use in the treatment and/or prophylaxis of tumor diseases. Tumor diseases which can be treated with the pharmaceutical composition of the invention comprise mamma carcinomas, ovarian cancer, bronchial carcinomas, colon carcinomas, melanomas, bladder carcinomas, stomach carcinomas, head and neck cancer, brain tumors, cervical cancer, prostate carcinomas, testicular carcinomas, bone tumors, renal carcinomas, pancreas tumors, esophageal cancer, malignant lymphomas, non-Hodgkin lymphomas, Hodgkin lymphomas and thyroid lymphomas.

The present invention also comprises nucleotide molecules for use in the treatment and/or prophylaxis of Ebola fever. Ebola fever is an infectious disease which is caused by the Ebola virus. The Ebola virus is a genus belonging to the family of Filoviridae. The genus comprises five species and 14 subtypes of enveloped single-strand RNA-viruses. The Ebola virus is of threadlike form, sometimes also of bacillus-like form.

Ebola viruses are able to replicate in almost all cells of the host. Due to the rapid virus synthesis a virus crystal (crystalloid) is formed which grows from the area of the cell nucleus toward the cell surface and, after cell lysis, releases individual viruses.

To date, it was not possible to identify the natural reservoir of Ebola viruses (main host, reservoir host) unequivocally. Some bat species as well as some fruit bats which are common in Africa and survive infection with Ebola viruses are considered possible reservoir hosts. Up to date, transmission of the virus from the reservoir host to humans is rather rare and the exact route of transmission has not yet been completely elucidated. According to WHO information, a transmission of the virus to humans also occurred due to body contact with infected ill or dead animals such as monkeys, African forest antelopes and fruit bats.

Human-to-human transmission of Ebola viruses occurs due to direct body contact and upon contact with body excretions of infected individuals via contact infection or lubricating infection, respectively. Furthermore, transmission by droplet infection (airborne transmission), sexual contact and after birth (neonatal transmission) is also possible while these transmission routes play only a minor role up to date. The incubation period varies between 2 and 21 days. Due to the high mortality rate (25-90%) and the high risk of infection, the pathogen is classified in the highest risk group 4 according to the German Ordinance on Biological Substances (Biostoffverordnung).

At the end of the incubation period, symptoms like those of a beginning flu appear. Subsequently, hemorrhagic fever (high fever with >38.5° C. in connection with bleedings), liver and kidney dysfunctions with edema, internal bleeding, bleeding in the tissue (bruising), bloody stools and urine, states of shock and circulatory collapse, spasms and signs of paralysis, nausea with vomiting, diarrhoea as well as skin and mucosal hemorrhages occur. The infection spreads to the whole organism and destroys the blood capillaries. In particular, hemorrhages in the gastrointestinal tract, in the spleen and in the lungs are lethal. At the cell-biological level, it was possible to identify how the Ebola virus enters the cell. The Zaire Ebola virus activates the so-called phosphosinositid-3 kinase (PI3K) via a membrane receptor of the receptor tyrosine kinase class that is unknown up to date and, thus, causes its internalisation in the cell in form of endosomes. Inhibitors of PI3K and downstream enzymes prevent the infection in cell culture tests, which gives reason for hope with respect to future treatment possibilities. Furthermore, it is known that the expression of the glycol receptor "liver and lymph node sinusoidal endothelial cell C-type lectin" (LSECtin) on myeloid cells confers binding capacity to the Ebola virus. There are five different species of Ebola viruses which are named according to the site of their first occurrence: Zaire Ebola virus (6 subtypes), Sudan Ebola virus (SEBOV) (3 subtypes), Côte d'Ivoire Ebola virus (CIEBOV) (1 subtype), Bundibugyo Ebola virus (BEBOV) and the Reston Ebola virus (4 subtypes). The four species mentioned first cause hemorrhagic fever in humans with a mortality rate of approximately 50 to 90%.

Currently, siRNA sequences which are directed against specific sequences of the viral genome of Ebola are tested for use against Ebola fever by Tekmira Pharmaceutical Corporation. The drug "TKM-Ebola" is an anti-Ebola-virus RNAi construct which showed 100% protection against Zaire Ebola virus in primates. However, on Jul. 3, 2014, it was reported that the clinical phase (TKM Ebola Phase I Clinical Trial) was temporarily stopped in healthy test persons by the FDA since increased cytokine values had been observed. Increased cytokine values are indicative of an unspecific immune reaction. For this reason, in a preferred embodiment, the present invention relates to a peptide for use in the reduction of side-effects in form of immunostimulatory reactions/effects which occur with gene therapy wherein the peptide is coupled to a nucleic acid molecule used in gene therapy, with the nucleic acid molecules being suited for application in the treatment and/or prophylaxis of Ebola fever. Within the meaning of the foregoing, the nature of the nucleic acid molecule is not limited to a concrete nucleic acid molecule. Likewise, the target sequence of the nucleic acid molecule is not limited to a specific sequence. Rather, the person skilled in the art can select the appropriate/suited sequence of the Ebola virus genome and use it according to the invention.

Moreover, for the use in the reduction of side-effects in form of immunostimulatory reactions/effects which occur with gene therapy, wherein the peptide is coupled to a nucleic acid molecule, preferably an siRNA molecule, used in gene therapy, in a further preferred embodiment, the peptide of the invention can optionally be formulated in combination with a "pharmacologically acceptable carrier" and/or solvents. Examples of particularly suited pharmacologically acceptable carriers are known to the person skilled in the art and include buffered salines, water, emulsions such as e.g. oil/water emulsions, different types of detergents, sterile solutions etc.

Pharmaceutical compositions within the meaning of the invention comprising the above-mentioned pharmacologically acceptable carriers can be formulated with conventional methods that are known. These pharmaceutical compositions can be administered to an individual in a suited dose. The administration can be oral or parenteral, e.g. intravenous, intraperitoneal, subcutaneous, intramuscular, local, intranasal, intrabronchial or intradermal or via a catheter at a site in an artery. The type of dosage is determined by the physician in accordance with the clinical factors. The person skilled in the art knows that the type of dosage depends on different factors, such as e.g. body height and weight, respectively, body surface, age, gender or the general health of the patient, but also on the specific drug to be administered, the duration and type of administration and on other medicaments which are possibly administered in parallel. Thus, a typical does can, for example, be within a range of 0.01 and 10000 µg with doses below or above this exemplary range can be envisaged, in particular considering the factors mentioned above. In general, with regular administration of the pharmaceutical formulation, the dose should be within a range between 10 ng and 10 mg units per day and application interval, respectively. If the composition is administered intravenously, the dose should be within a range between 1 ng and 0.1 mg units per kilogram body weight per minute.

The pharmaceutical compositions of the invention can be administered locally or systemically. Preparations for parenteral administration comprise sterile aqueous or non-aqueous solutions, suspensions and emulsions. Examples of non-aqueous solvents are propylene glycol, polyethylene glycol, plant oils such as olive oil and organic ester compounds such as ethyloleate which are suited for injection. Aqueous carriers comprise water, alcoholic-aqueous solutions, emulsions, suspensions, salines and buffered media. Parenteral carriers comprise sodium chloride solutions, Ringer's dextrose, dextrose and sodium chloride, Ringer's lactate and bound oils. Intravenous carriers comprise e.g. fluid, nutrition and electrolyte supplements (such as those based on Ringer's dextrose). The pharmaceutical compositions of the invention can also comprise preservation agents and other additives such as e.g. antimicrobial compounds, antioxidants, complexing agents and inert gazes. Further, depending on the intended use, compounds such as e.g. interleukins, growth factors, differentiation factors, interferons, chemotactic proteins or an unspecific immunomodulatory agent may be contained.

Furthermore, different peptides of the invention, for use in the reduction of side effects in form of immunostimulatory reactions/effects occurring in gene therapy wherein the peptide is coupled to a nucleic acid molecule, preferably an siRNA molecule, used in gene therapy can also be administered in combination simultaneously or at different times and can be used in identical or different concentrations. In the case of an siRNA, it is, for example, possible to efficiently turn off ("silence") a plurality of genes or degrade mRNAs by using different peptide/nucleic acid molecule constructs of the invention.

Furthermore, the present invention relates to methods for the treatment by reduction of side-effects in form of immunostimulatory reactions/effects which occur with gene therapy, wherein a nucleic acid molecule used in gene therapy is coupled to a peptide and the coupling to the nucleic acid molecule reduces the side-effects caused by the nucleic acid molecule in form of immunostimulatory reactions/effects. With respect to the preferred embodiments of the treatment method, the above explanations regarding the peptide apply mutatis mutandis.

The reduction of side-effects according to the invention in form of immunostimulatory reactions/effects occurring with gene therapy due to the coupling of the nucleic acid molecules to peptides can optionally be combined with other possibilities of reducing immunostimulatory effects by siRNA, for example MeO modification.

Moreover, it is, for example, possible to use said immunostimulatory effects in a supporting targeted manner in order to stress cells in addition to the intended gene silencing in such a way that they are selectively and reliably damaged or killed, respectively. This is in particular an advantage with cell types which are to be reliably killed and which are very adaptable with regard to their genome and their physiology and which are not sufficiently influenced by silencing one single gene or a few genes, for example virus-infected and/or tumor cells. Thus, it is possible in a further embodiment to use nucleic acid molecules which, according to the invention, are first coupled to a peptide, whereby the immunostimulatory reactions or effects are reduced or suppressed, and which are introduced in a targeted manner into specific cells in which the peptide is cleaved. For example, in a preferred embodiment it is possible to use the nucleic acid molecules described above (preferably siRNA molecules) which are targeted to virus-infected and/or tumor cells and to additionally induce immunostimulatory effects by cleaving a peptide of the invention in these cells in order to support the actual (specific) effect of the siRNA in these cells in a targeted manner.

It is advantageous to have an application kit for the modification of the nucleic acids, application and administration of the peptide-modified nucleic acids, consisting of at least at least one ampoule (ampoule A) which contains the peptide which is to bind to the nucleic molecule and can further contain:

at least one further ampoule (ampoule B) with a transfection system, for example nanoparticles, polyethyleneimine or lipids, at least one further ampoule (ampoule C) which contains further components which are to bind the nucleic acid molecules and/or which are to bind to a transfection system, dilution or reaction buffer for the contents of ampoules A, B and C one or more probes and syringes with cannulas, respectively, and other materials required for injection of the mixture from the contents of the ampoules into the medium containing the target cells as well as application and administration instructions.

All publications, patents and patent applications and other documents cited herein are included herein by reference in their entirety.

In the following, the invention is explained in more detail by means of embodiments shown in the FIGURE.

It is shown:

FIG. 1: representation of the expression of IFIT-1 and TLR-3 as markers for the induction of immunostimulatory effects.

FIG. 1 shows the expression of IFIT-1 and TLR-3 as markers for the induction of immunostimulatory effects, normalized to the expression in untreated cells as negative control. While the transfection system, the control siRNA and the free siRNA each induce strong immunostimulatory effects, these are significantly reduced by peptide binding In the FIGURE, the following terms refer to:
transfection control: empty transfection without siRNA
Ctrl-siRNA: control transfection with a control (nonsense) siRNA
CHMP (1-3): siRNA against CHMP
RFWD (1-3): siRNA against RFWD
ATAP (1-3): siRNA against ATAP
AGAP (1-3): siRNA against AGAP
Allstars siRNA cocktail: mixture of several siRNAs for induction of toxicity.

For detection, as described in detail hereinafter, the cells to be treated were cultivated in 24-well cell culture plates and siRNA transfections were carried out. 24 hours after transfection, the RNA of the cells was isolated, transcribed into cDNA and analyzed for the relevant genes with RT-PCR.

The siRNA transfection assay was carried out in MCF7 cells as follows:

Cell culture: The growing adherent cells (MCF7, ATCC HTB-22) were cultivated in Petri dishes in DMEM medium (10% FCS) under standard conditions (37° C., 5% CO2, humid atmosphere) and regularly treated by trypsination and divided every 72 hours. In preparation for the transfection assay, 100,000 cells/well each were transferred to in a 24-well plate and cultivated for 24 hours.

Preparation of the siRNA/Peptide siRNA:

The siRNA sequences used were commercially synthesized and purchased; Axolabs. The following siRNA sequences were synthesized:

```
AGAP (sense; 5'-3')
                                  (SEQ ID NO: 20)
CCC AGA CAA AGA GAA GAA AdTdT AGAP (antisense; 5'-3')
                                  (SEQ ID NO: 21)
UUU CUU CUC UUU GUC UGG GdTdT CHMP (sense; 5'-3')
                                  (SEQ ID NO: 22)
AGA UCA UGA UGG AGU UUG AdTdT CHMP (antisense; 5'-3')
                                  (SEQ ID NO: 23)
UCA AAC UCC AUC AUG AUC UdTdT AGAP (sense; 5'-3')
                                  (SEQ ID NO: 24)
UGC UCC UGC UCU GAA GAA AdTdT AGAP (antisense, 5'-3')
                                  (SEQ ID NO: 25)
UUU CUU CAG AGC AGG AGC AdTdT RFWD (sense; 5'-3')
                                  (SEQ ID NO: 26)
GCA CAG UGC CUC AAU UUG AdTdT RFWD (antisense; 5'-3')
                                  (SEQ ID NO: 27)
UCA AAU UGA GGC ACU GUG CdTdT
```

The antisense strands were modified with a 5' aminohexyl linker each; all siRNAs carried a phosphothioate modification between the two DNA-T nucleotides; individual samples were coupled to the peptides identified below via the amino linker via a peptide bond and purified by means of RP-HPLC. In all cases, the purity of the siRNAs/peptide siRNAs was higher than 95% (analyzed by LC/MS, HPLC; MALDI-TOF). The siRNAs/peptide siRNAs were each annealed and used in desalted form. The peptides used were the following sequences:

```
Legumain-1:
                                  (SEQ ID NO: 28)
Z-Ala-Ala-Asn-Gly- Legumain-2:
                                  (SEQ ID NO: 29)
Ac-Gly-Gly-Ala-Phe-Leu-Val-Leu-Pro-Ala-Ala-Asn-Glycathepsin:
                                  (SEQ ID NO: 30)
Ac-Gly-Gly-Ala-Phe-Leu-Val-Leu-Pro-
```

Transfection with siRAN/peptide siRNA: The relevant siRNA and peptide siRNA sequences were adjusted at a concentration of 10 µmol/l and complexed with lipofectamine (Invitrogen). The medium was removed from the cells and the cells were washed with 2 ml/well PBS in each case. Subsequently, 200 µl Optimem medium were added and lipofectamine-complexed siRNA/peptide siRNA was added at a final concentration of 10 nmol/l. After an incubation period of 6 hours under standard conditions, the transfection medium (Optimem still containing lipofectamine-siRNA complexes) was removed and 1 ml standard medium (DMEM, 10% FCS) was added to each well. The experiment was carried out in triplicates.

Termination of cell culture, RNA isolation: 24 hours after addition of the lipofectamine-siRNA/peptide siRNA complexes, the RNA was isolated from the cells. To this aim, the culture medium was removed from the wells and each well was washed with 2 ml PBS each. Subsequently, 125 µl TRIzol solution was added to each well and the cell lysates were transferred into Eppendorf dishes; followed by precipitation of RNA using chloroform and ethanol, centrifugation steps and the dissolution of the RNA in water.

cDNA synthesis and qPCR: After examining RNA quality by means of MOPS gel electrophoresis, the isolated RNA was transcribed into cDNA using random primers. Subsequently, the gene expression of TLR3 and IFIT1 was quantified by means of quantitative PCR (qTower; Analytik Jena; Cybergreen System; Primer (5'-3') huIFIT1_fwd att tac agc aac cat gag tac aaa (SEQ ID NO:31); huIFIT1_rev ggc ttc ctc att ctg gcc (SEQ ID NO:32); huTLR3_fwd tca ctt gct cat tct ccc tta c (SEQ ID NO:33); huTLR3_rev ctg tga gtt ctt gcc caa ttt c (SEQ ID NO:34)). The PCR analyses were carried out in triplicate; the ct values obtained were put into relation to the expression of RNA18s in order to map the relative expression using the ΔΔ ct method.

The results are shown in FIG. 1.

The instant application contains a Sequence Listing which has been submitted electronically as an ASCII text file and is hereby incorporated by reference in its entirety. Said ASCII text file was created on Apr. 21, 2022, is named "1438-P021 Sequence Listing ST25" and has a file size of 7630 bytes.

What is claimed is:

1. A coupled peptide, the coupled peptide comprising a peptide covalently coupled to a nucleic acid molecule, wherein
a cleavage sequence of the peptide consists of Ala-Ala-Asn, or Ala-Ala-Asn-Gly (SEQ ID NO:28), or Gly-Gly-Ala-Phe-Leu-Val-Leu-Pro (SEQ ID NO: 4), or Glu-Gly-Arg;
the nucleic acid molecule is covalently coupled to the peptide by a linker, the linker consisting of an amino Cn linker, with n being an integer of 1-6;
the nucleic acid is an siRNA, the siRNA comprising a nucleotide sequence selected from

```
                                         (SEQ ID NO: 8)
(5-3) UCA UAU UCG ACU UUG GUU GCC, (SEQ ID NO: 9)
(5-3) UCA AAC UCC AUC AUG AUC U, (SEQ ID NO: 10)
(5-3) UCC AUC AUG AUC UUC UGG A, (SEQ ID NO: 11)
(5-3) UUC AUA AAC ACA GUU CUC C, (SEQ ID NO: 12)
(5-3) UCA AAU UGA GGC ACU GUG C, (SEQ ID NO: 13)
(5-3) UUU CUU CAG AGC AGG AGC A, (SEQ ID NO: 14)
(5-3) AUA CAC ACC CUU UGC CUC A, (SEQ ID NO: 15)
(5-3) AUU UCA GGC UCA UAU UCC U, (SEQ ID NO: 16)
(5-3) CAC AAU UCC CAC UUU GAG C, (SEQ ID NO: 17)
(5-3) GUU ACC CAC AAU UCC CAC U, (SEQ ID NO: 18)
(5-3) UUU CUU CUC UUU GUC UGG G, (SEQ ID NO: 19)
(5-3) UAU UCU CCA AAC AAU GUG C;
``` and wherein the peptide may further comprise up to 100 additional amino acids, and the additional amino acids are placed at a N-terminal end of the cleavage sequence.

2. The coupled peptide according to claim 1, wherein the siRNA comprises the nucleotide sequence

```
                                         (SEQ ID NO: 9)
(5-3) UCA AAC UCC AUC AUG AUC U;
or
                                         (SEQ ID NO: 18)
(5-3) UUU CUU CUC UUU GUC UGG G.
```

3. The coupled peptide according to claim 1, wherein the coupled peptide is covalently or non-covalently linked to at least one molecule selected from the group of a cell-penetrating peptide, an enzyme substrate, a polyethyleneimine, a nanocontainer, a nanoparticle, a lipid, or a receptor-ligand complex for introduction into cells or for targeted introduction into specific cells.

4. A gene therapy method, comprising administering to a subject in need thereof the coupled peptide according to claim 1.

5. The gene therapy method according to claim 4, wherein the immunostimulatory reactions/effects are induced by activation of the IFIT1/2 (interferon-induced protein tetratricopeptide with repeats 1/interferon-induced protein tetratricopeptide with repeats 2), IRF9 (interferon regulatory factor 9), TLR3 (toll-like receptor 3), TLR7 (toll-like receptor 7), TLR8 (toll-like receptor 8) or PKR (protein kinase R).

6. The coupled peptide of claim 1, wherein the cleavage sequence consists of Ala-Ala-Asn.

7. The coupled peptide of claim 1, wherein the cleavage sequence consists of Ala-Ala-Asn-Gly (SEQ ID NO:28).

8. The coupled peptide of claim 1, wherein the cleavage sequence consists of Gly-Gly-Ala-Phe-Leu-Val-Leu-Pro (SEQ ID NO:4).

9. The coupled peptide of claim 1, wherein the cleavage sequence consists of Glu-Gly-Arg.

\* \* \* \* \*

SEQUENCE LISTING

<160> NUMBER OF SEQ ID NOS: 34

<210> SEQ ID NO 1
<211> LENGTH: 5
<212> TYPE: PRT
<213> ORGANISM: Artificial Sequence
<220> FEATURE:
<223> OTHER INFORMATION: Cleavage sequence for Caspase-4

<400> SEQUENCE: 1

Leu Glu Val Asp Gly
1               5

<210> SEQ ID NO 2
<211> LENGTH: 5
<212> TYPE: PRT
<213> ORGANISM: Artificial Sequence
<220> FEATURE:
<223> OTHER INFORMATION: Cleavage sequence fo KLK

<400> SEQUENCE: 2

Val Gln Gln Lys Ser
1               5

<210> SEQ ID NO 3
<211> LENGTH: 5
<212> TYPE: PRT
<213> ORGANISM: Artificial Sequence
<220> FEATURE:
<223> OTHER INFORMATION: Cleavage sequence for PLAP

<400> SEQUENCE: 3

Pro His Ile Tyr Val
1               5

<210> SEQ ID NO 4
<211> LENGTH: 8
<212> TYPE: PRT
<213> ORGANISM: Artificial Sequence
<220> FEATURE:
<223> OTHER INFORMATION: Cleavage sequence for Cathepsin-E

<400> SEQUENCE: 4

Gly Gly Ala Phe Leu Val Leu Pro
1               5

<210> SEQ ID NO 5
<211> LENGTH: 8
<212> TYPE: PRT
<213> ORGANISM: Artificial Sequence
<220> FEATURE:
<223> OTHER INFORMATION: Cleavage sequence for Cathepsin-E

<400> SEQUENCE: 5

Ala Leu Ala Phe Ser Leu Ala Ala
1               5

<210> SEQ ID NO 6
<211> LENGTH: 5
<212> TYPE: PRT
<213> ORGANISM: Artificial Sequence
<220> FEATURE:
<223> OTHER INFORMATION: Cleavage sequence for CMV-Protease

<400> SEQUENCE: 6

Pro Ser Val Ser Ala
1               5

```
<210> SEQ ID NO 7
<211> LENGTH: 5
<212> TYPE: PRT
<213> ORGANISM: Artificial Sequence
<220> FEATURE:
<223> OTHER INFORMATION: Cleavage sequence for EBV-Protease

<400> SEQUENCE: 7

Glu Ser Ala Ser Ala
1               5

<210> SEQ ID NO 8
<211> LENGTH: 21
<212> TYPE: RNA
<213> ORGANISM: Artificial Sequence
<220> FEATURE:
<223> OTHER INFORMATION: Oligonucleotide

<400> SEQUENCE: 8
ucauauucga cuuugguugc c                                              21

<210> SEQ ID NO 9
<211> LENGTH: 19
<212> TYPE: RNA
<213> ORGANISM: Artificial Sequence
<220> FEATURE:
<223> OTHER INFORMATION: Oligonucleotide

<400> SEQUENCE: 9
ucaaacucca ucaugaucu                                                 19

<210> SEQ ID NO 10
<211> LENGTH: 19
<212> TYPE: RNA
<213> ORGANISM: Artificial Sequence
<220> FEATURE:
<223> OTHER INFORMATION: Oligonucleotide

<400> SEQUENCE: 10
uccaucauga ucuucugga                                                 19

<210> SEQ ID NO 11
<211> LENGTH: 19
<212> TYPE: RNA
<213> ORGANISM: Artificial Sequence
<220> FEATURE:
<223> OTHER INFORMATION: Oligonucleotide

<400> SEQUENCE: 11
uucauaaaca caguucucc                                                 19

<210> SEQ ID NO 12
<211> LENGTH: 19
<212> TYPE: RNA
<213> ORGANISM: Artificial Sequence
<220> FEATURE:
<223> OTHER INFORMATION: Oligonucleotide

<400> SEQUENCE: 12
ucaaauugag gcacugugc                                                 19

<210> SEQ ID NO 13
<211> LENGTH: 19
<212> TYPE: RNA
<213> ORGANISM: Artificial Sequence
```

```
<220> FEATURE:
<223> OTHER INFORMATION: Oligonucleotide

<400> SEQUENCE: 13
uuucuucaga gcaggagca                                                19

<210> SEQ ID NO 14
<211> LENGTH: 19
<212> TYPE: RNA
<213> ORGANISM: Artificial Sequence
<220> FEATURE:
<223> OTHER INFORMATION: Oligonucleotide

<400> SEQUENCE: 14
auacacaccc uuugccuca                                                19

<210> SEQ ID NO 15
<211> LENGTH: 19
<212> TYPE: RNA
<213> ORGANISM: Artificial Sequence
<220> FEATURE:
<223> OTHER INFORMATION: Oligonucleotide

<400> SEQUENCE: 15
auuucaggcu cauauuccu                                                19

<210> SEQ ID NO 16
<211> LENGTH: 19
<212> TYPE: RNA
<213> ORGANISM: Artificial Sequence
<220> FEATURE:
<223> OTHER INFORMATION: Oligonucleotide

<400> SEQUENCE: 16
cacaauuccc acuuugagc                                                19

<210> SEQ ID NO 17
<211> LENGTH: 19
<212> TYPE: RNA
<213> ORGANISM: Artificial Sequence
<220> FEATURE:
<223> OTHER INFORMATION: Oligonucleotide

<400> SEQUENCE: 17
guuacccaca aucccacu                                                 19

<210> SEQ ID NO 18
<211> LENGTH: 19
<212> TYPE: RNA
<213> ORGANISM: Artificial Sequence
<220> FEATURE:
<223> OTHER INFORMATION: Oligonucleotide

<400> SEQUENCE: 18
uuucuucucu uugucuggg                                                19

<210> SEQ ID NO 19
<211> LENGTH: 19
<212> TYPE: RNA
<213> ORGANISM: Artificial Sequence
<220> FEATURE:
<223> OTHER INFORMATION: Oligonucleotide

<400> SEQUENCE: 19
uauucuccaa acaaugugc                                                19
```

```
<210> SEQ ID NO 20
<211> LENGTH: 21
<212> TYPE: RNA
<213> ORGANISM: Artificial Sequence
<220> FEATURE:
<223> OTHER INFORMATION: siRNA AGAP (sense; 5'-3')
<220> FEATURE:
<221> NAME/KEY: misc_feature
<222> LOCATION: (20)..(21)
<223> OTHER INFORMATION: /note="phosphorothioate modified thymine"

<400> SEQUENCE: 20
cccagacaaa gagaagaaan n                                              21

<210> SEQ ID NO 21
<211> LENGTH: 21
<212> TYPE: RNA
<213> ORGANISM: Artificial Sequence
<220> FEATURE:
<223> OTHER INFORMATION: siRNA AGAP (antisense; 5'-3')
<220> FEATURE:
<221> NAME/KEY: misc_feature
<222> LOCATION: (20)..(21)
<223> OTHER INFORMATION: /note="phosphorothioate modified thymine"

<400> SEQUENCE: 21
uuucuucucu uugucugggn n                                              21

<210> SEQ ID NO 22
<211> LENGTH: 21
<212> TYPE: RNA
<213> ORGANISM: Artificial Sequence
<220> FEATURE:
<223> OTHER INFORMATION: siRNA CHMP (sense; 5'-3')
<220> FEATURE:
<221> NAME/KEY: misc_feature
<222> LOCATION: (20)..(21)
<223> OTHER INFORMATION: /note="phosphorothioate modified thymine"

<400> SEQUENCE: 22
agaucaugau ggaguuugan n                                              21

<210> SEQ ID NO 23
<211> LENGTH: 21
<212> TYPE: RNA
<213> ORGANISM: Artificial Sequence
<220> FEATURE:
<223> OTHER INFORMATION: siRNA CHMP (antisense; 5'-3')
<220> FEATURE:
<221> NAME/KEY: misc_feature
<222> LOCATION: (20)..(21)
<223> OTHER INFORMATION: /note="phosphorothioate modified thymine"

<400> SEQUENCE: 23
ucaaacucca ucaugaucun n                                              21

<210> SEQ ID NO 24
<211> LENGTH: 21
<212> TYPE: RNA
<213> ORGANISM: Artificial Sequence
<220> FEATURE:
<223> OTHER INFORMATION: siRNA AGAP (sense; 5'-3')
<220> FEATURE:
<221> NAME/KEY: misc_feature
<222> LOCATION: (20)..(21)
<223> OTHER INFORMATION: /note="phosphorothioate modified thymine"

<400> SEQUENCE: 24
ugcuccugcu cugaagaaan n                                              21
```

```
<210> SEQ ID NO 25
<211> LENGTH: 21
<212> TYPE: RNA
<213> ORGANISM: Artificial Sequence
<220> FEATURE:
<223> OTHER INFORMATION: siRNA AGAP (antisense; 5'-3')
<220> FEATURE:
<221> NAME/KEY: misc_feature
<222> LOCATION: (20)..(21)
<223> OTHER INFORMATION: /note="phosphorothioate modified thymine"

<400> SEQUENCE: 25
uuucuucaga gcaggagcan n                                              21

<210> SEQ ID NO 26
<211> LENGTH: 21
<212> TYPE: RNA
<213> ORGANISM: Artificial Sequence
<220> FEATURE:
<223> OTHER INFORMATION: siRNA RFWD (sense; 5'-3')
<220> FEATURE:
<221> NAME/KEY: misc_feature
<222> LOCATION: (20)..(21)
<223> OTHER INFORMATION: /note="phosphorothioate modified thymine"

<400> SEQUENCE: 26
gcacagugcc ucaauuugan n                                              21

<210> SEQ ID NO 27
<211> LENGTH: 21
<212> TYPE: RNA
<213> ORGANISM: Artificial Sequence
<220> FEATURE:
<223> OTHER INFORMATION: siRNA RFWD (antisense; 5'-3')
<220> FEATURE:
<221> NAME/KEY: misc_feature
<222> LOCATION: (20)..(21)
<223> OTHER INFORMATION: /note="phosphorothioate modified thymine"

<400> SEQUENCE: 27
ucaaauugag gcacugugcn n                                              21

<210> SEQ ID NO 28
<211> LENGTH: 4
<212> TYPE: PRT
<213> ORGANISM: Artificial Sequence
<220> FEATURE:
<223> OTHER INFORMATION: Legumain-1
<220> FEATURE:
<221> NAME/KEY: BLOCKED
<222> LOCATION: (1)..(1)
<223> OTHER INFORMATION: on amino acid 1 optionally blocked with Z;
      Z=benzyloxycarbonyl

<400> SEQUENCE: 28

Ala Ala Asn Gly
1

<210> SEQ ID NO 29
<211> LENGTH: 12
<212> TYPE: PRT
<213> ORGANISM: Artificial Sequence
<220> FEATURE:
<223> OTHER INFORMATION: Legumain-2
<220> FEATURE:
<221> NAME/KEY: MOD_RES
<222> LOCATION: (1)..(1)
<223> OTHER INFORMATION: acetylation on amino acid 1
```

```
<400> SEQUENCE: 29

Glu Glu Ala Phe Leu Val Leu Pro Ala Ala Asn Glu
1               5                   10

<210> SEQ ID NO 30
<211> LENGTH: 8
<212> TYPE: PRT
<213> ORGANISM: Artificial Sequence
<220> FEATURE:
<223> OTHER INFORMATION: Cathepsin
<220> FEATURE:
<221> NAME/KEY: MOD_RES
<222> LOCATION: (1)..(1)
<223> OTHER INFORMATION: acetylation on amino acid 1

<400> SEQUENCE: 30

Glu Glu Ala Phe Leu Val Leu Pro
1               5

<210> SEQ ID NO 31
<211> LENGTH: 24
<212> TYPE: RNA
<213> ORGANISM: Artificial Sequence
<220> FEATURE:
<223> OTHER INFORMATION: Primer

<400> SEQUENCE: 31
atttacagca accatgagta caaa                                              24

<210> SEQ ID NO 32
<211> LENGTH: 18
<212> TYPE: RNA
<213> ORGANISM: Artificial Sequence
<220> FEATURE:
<223> OTHER INFORMATION: Primer (huIFIT1_rev)

<400> SEQUENCE: 32
ggcttcctca ttctggcc                                                     18

<210> SEQ ID NO 33
<211> LENGTH: 22
<212> TYPE: RNA
<213> ORGANISM: Artificial Sequence
<220> FEATURE:
<223> OTHER INFORMATION: Prime (huTLR3_fwd)

<400> SEQUENCE: 33
tcacttgctc attctccctt ac                                                22

<210> SEQ ID NO 34
<211> LENGTH: 22
<212> TYPE: RNA
<213> ORGANISM: Artificial Sequence
<220> FEATURE:
<223> OTHER INFORMATION: Primer (huTLR3_rev)

<400> SEQUENCE: 34
ctgtgagttc ttgcccaatt tc                                                22
```